United States Patent

Lipscomb

[15] 3,705,742
[45] Dec. 12, 1972

[54] VEHICLE BUMPER ASSEMBLY

[72] Inventor: Willis L. Lipscomb, 2208 Willow, San Diego, Calif. 92106

[22] Filed: Nov. 1, 1971

[21] Appl. No.: 194,344

[52] U.S. Cl. ........................293/89, 293/84, 293/88
[51] Int. Cl. .............................................B60r 19/06
[58] Field of Search......293/84, 85, 86, 88, 89, 71 R; 267/57, 157

[56] References Cited

UNITED STATES PATENTS

| | | | |
|---|---|---|---|
| 3,432,200 | 3/1969 | Barton | 293/71 R |
| 1,565,882 | 12/1925 | Adams | 293/88 X |
| 3,222,083 | 12/1965 | Stotz et al. | 280/124 |
| 3,575,454 | 4/1971 | Meeker | 293/62 |

FOREIGN PATENTS OR APPLICATIONS 879,225  10/1961  Great Britain.........................293/85

Primary Examiner—Gerald M. Forlenza
Assistant Examiner—Robert Saifer
Attorney—Roy L. Knox

[57] ABSTRACT

A vehicle bumper assembly providing for limited damping of transverse or slanting of the bumper or impact-receiving member as well as damping of longitudinal movement under impact, the latter movement being opposed by a torsion bar. The torsion bar, conceived as ordinarily provided in duplicate, is located some considerable distance from the end of the vehicle and connected to the bumper by a push rod so that, as long as the relatively stout push bar remains functional the torsion bar will ordinarily be effective in damping the movement of the bumper relative to the frame. Novel means is provided for resiliently mounting the push bar and a unique dual function is obtained in the torsion bar since it is mounted for limited flexing as a spring in addition to its torque function. A resilient apron conceals the mechanical structure, prevents vibration noise and also has a minor supplementary buffering action. The primary supporting means resiliently holds the bumper in place while allowing, with resistive buffering action, transverse or slanting movement under impact conditions with little or no activation of the torsion bar which can therefore be structurally designed to handle the ordinarily greater longitudinal shocks.

8 Claims, 5 Drawing Figures

PATENTED DEC 12 1972 3,705,742
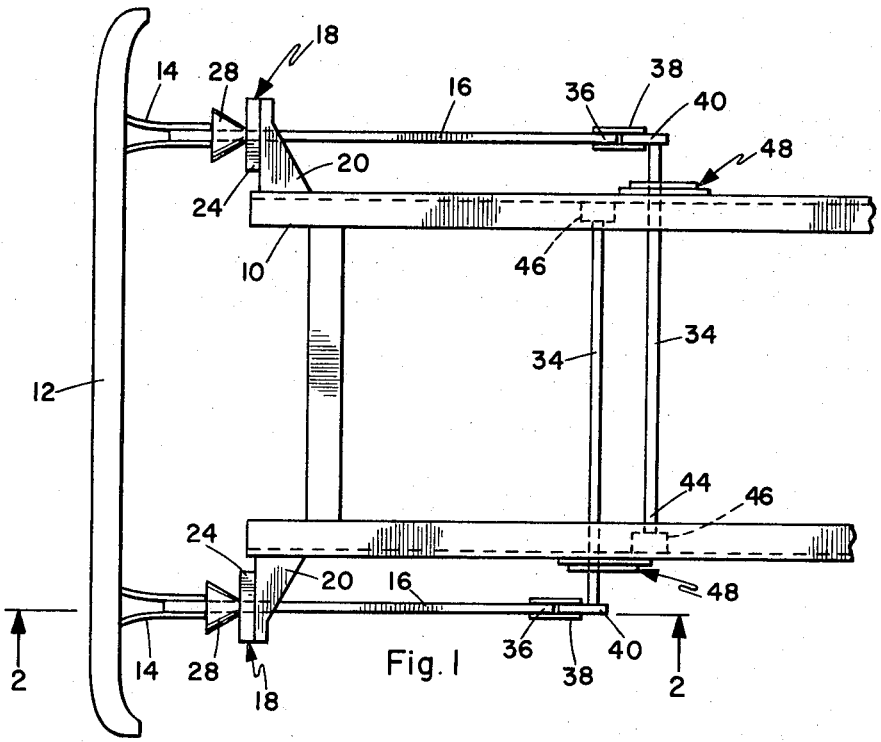
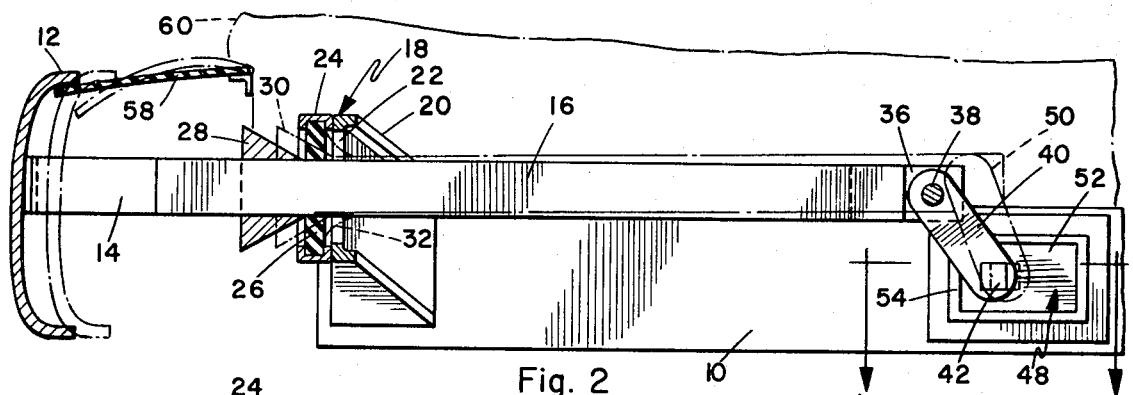
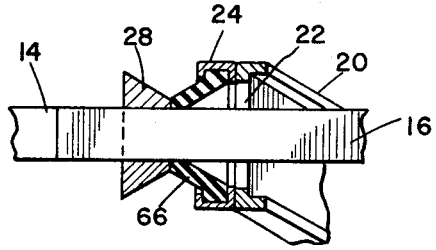
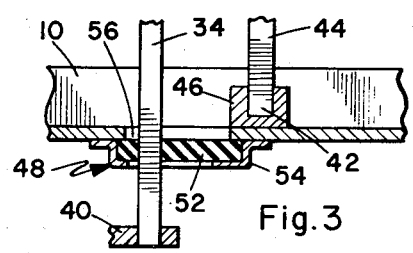
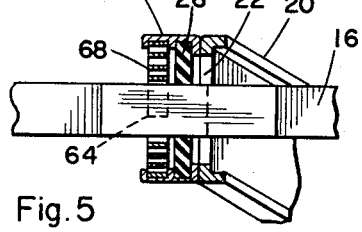
INVENTOR.
WILLIS L. LIPSCOMB
BY Roy L. Knox

VEHICLE BUMPER ASSEMBLY

BACKGROUND OF THE INVENTION

The related prior art includes many types of bumpers, some of which have the impact-receiving member resilient itself or carrying resilient pads or strips of resilient material, while many prior art bumpers have some sort of resilient mounting such as coil springs and leaf springs, and a torsion bar has been proposed for direct and in-line connection with a short length truck loading ramp bumper of sensor and signal giving type. Other approaches to the problem, particularly for passenger automobiles, have included pneumatic and fluid envelopes to absorb shock and more recently extensible bumpers. Some of these devices are cumbersome as well as expensive and unaesthetic in form and still incapable of giving reasonably full protection against variously directed shocks of widely varying degrees of force. There exists a need, therefore, for a bumper assembly which is effective against minor shocks having a lateral or transverse component, as often occur during parking of vehicles, as well as being capable of absorbing relatively great shocks with the major component being longitudinal of the vehicle as experienced in more serious collisions.

SUMMARY OF THE INVENTION

The present invention as claimed provides a solution to the foregoing problem and need, comprising a bumper assembly in which the bumper has an outer or primary resilient mounting means supporting the bumper on the ends of the vehicle frame yet permitting resisted movement particularly to buffer oblique minor shocks such as occur when one vehicle being parked or unparked bumps another parallel vehicle, and torsion bar structure for handling greater shocks directed longitudinally of the vehicle, the actual torsion bar structure being spaced from the bumper and ordinarily remaining effective as long as one or more impact transmitting pushbars remain functional. The mounting means includes a solid conical member, or alternatively a helical spring which under impact assumes a generally conical shape, which can progressively deform a rubber-like block of material as the bumper is moved toward the frame in the event of shocks applied in either longitudinal or oblique directions. The torsion bar is mounted so as to flex transversely as a spring as well as to twist for torque action. An elastomeric apron is added for noise abatement, a limited further buffering action and visual shielding.

BRIEF DESCRIPTION OF THE DRAWING

FIG. 1 is a top plan view of the basic bumper assembly;

FIG. 2 is an enlarged sectional view taken on line 2—2 of FIG. 1;

FIG. 3 is a sectional view taken on line 3—3 of FIG. 2;

FIG. 4 is a sectional view similar to a portion of FIG. 2, showing an alternative resilient mounting; and FIG. 5 is a similar section view showing a further modified mounting.

DETAILED DESCRIPTION OF A PREFERRED EMBODIMENT

Referring now to the drawing, the assembly is proposed for use with an automotive vehicle frame 10 which will ordinarily be that of a passenger or commercial road vehicle and which will be elongated as fragmentarily indicated in FIG. 1. The bumper 12, that is, the impact receiving member may be conventionally constructed to extend entirely across the front or rear of the vehicle, only one being illustrated in FIG. 1. The bumper is carried on substantially conventional brackets 14 which may be bolted or otherwise fixed to the outer ends of pushbars 16 which are stout bars resistive to bending, of considerable length extending longitudinally of the frame 10. As illustrated there are two such push bars 16 for each bumper.

Primary supporting means, generally indicated by the numeral 18, support the push bars 16 near the outer ends thereof and thus support the bumper.

The supporting means substantially illustrated comprises frame brackets 20 welded or bolted to the side beam members of the frame 10, these brackets 20 having openings 22 considerably larger than the push bars and having secured thereto, as by welding, sturdy annular channel members 24 or the equivalent in which are fixedly and peripherally held collar blocks 26 of resilient material such as synthetic rubber, each collar block encircling one of said pushbars 16. A cone 28 is fixed to each pushbar 16 immediately outwardly of the collar block 26 with the small end of the cone toward the collar block. The cone is sweated onto the pushbar, bolted thereto or otherwise affixed and may be made adjustable if desired, it being recalled that this subassembly 18 is primarily to locate and resiliently support the bumper against minor shocks including obliquely applied shocks, but the movement of the bumper under longitudinally applied shocks will cause the cone 28 to move toward the position thereof indicated in FIG. 2 in dash line at 30 deflecting and deforming the collar block 26 which resists this movement with progressively greater counteraction as the cone deflects and deforms the collar block, as indicated in dash line at 32 in FIG. 2.

To provide buffering against major shock directed more or less longitudinally of the vehicle frame at last one torsion bar 34 is operatively connected to the pushbar structure. It is preferred to extend both pushbars 16 a considerable distance inward of the frame, that is, well away from the subassembly 18 on the side thereof remote from the bumper 12, and the inner ends 36 of the pushbars are articulated in some manner, as indicated at 38, with the crank arms 40 of the torsion bars 34. Unitary construction of the torsion bar and the crank ends 40 may be employed or other means may be used, such as the non-cylindrical terminals 42 indicated in FIG. 2 with corresponding crank arms 40 pivoted to the pushbar ends 36.

Rigid securement of one end 44 of each torsion bar to the frame, at the side of the frame the corresponding crank arm 40, as at 46 is necessary and slightly resilient mounting means generally indicated at 48 is provided for the torsion bar adjacent to the crank arm 40, thus achieving an important simple spring function as well as pure torque function in the torsion bar 34. In other words the crank end of the torsion bar can flex to the position indicated in dash line at 50 while coincidentally resisting twisting to give the desired mounting 18 which may take the form of a resilient pad 52 peripherally secured by a flanged shell 54 on a flange of the frame 10 apertured as at 56 to permit the flexing movement of the torsion bar 34.

An elastomeric form retaining apron 58 bridges the space between the bumper and an adjacent portion of the vehicle diagrammatically indicated at 60. This apron 58 is omitted from FIG. 1 but will be understood as extending the full width of the vehicle frame 10 including the supporting structure such as the bumper brackets 14 and cones 28 which are completely shielded by the apron. The apron can flex considerably but will function as a vibration damper for the bumper assembly as well as a visual shield and will function further in reduceing transmission of chassis and road contact noise upwardly toward the passenger compartment.

Finally, two variations of the above referred to primary supporting means 18 are illustrated in FIGS. 4 and 5. In FIG. 4 the collar block 26 is modified to conical form as at 66 and on movement of the push bar and cone 28, as to the right in this figure, the conical collar block is placed under rapidly increasing compression. In FIG. 5 the collar block 26 is unchanged but the cone 28 is replaced by a helical spring 68 which is effectively conical in form when the push bar is moved as to the right in this figure since the peripheral portion of the spring is fixedly held by an annular channel member 62, which may be unitary with member 24 while the inner end of the spring is fixed by bolting or otherwise to the pushbar 16 as indicated at 64.

The operation of this invention will be obvious from the foregoing description except that in the event of collision as for example with a roadside object or in a vehicle sideswipe the impact is applied to an end portion of the bumper transversely outwardly of one of the brackets 14, and the other end of the bumpers will tend to be pivoted in the opposite direction about the first mentioned bracket as a pivot. When this occurs the pushbars are both activated but in opposite directions and both torsion bars are activated in absorbing the shock.

I claim:

1. A bumper assembly for mounting on an end of elongated frame of a road vehicle, comprising;
   an impact-receiving member;
   resilient primary supporting means mounting said member transversely of and upon an end of the vehicle frame and resiliently resisting minor and transverse deflection of said impact receiving member;
   and secondary supporting means disposed on the side of said primary supporting means remote from said member and comprising at least one torsion bar having a portion thereof fixed to said frame and a crank arm with positive two-way drive linkage connecting the crank arm to said impact-receiving member to resist major movement of the impact member in a direction transverse to the longitudinal axis of the member and longitudinally of the frame of the vehicle.

2. A bumper assembly according to claim 1 wherein said torsion bar and crank are each duplicated, the cranks being one at each side of said frame and the torsion bars being each fixed to that side of the frame remote from the corresponding crank.

3. A bumper assembly according to claim 1 wherein said linkage includes a pushbar of considerable length connected to and between said member and said crank arm of the torsion bar so that the torsion bar is mounted a considerable distance from the impact-receiving member, inwardly of the vehicle frame and spaced well away from said end of the frame.

4. A bumper assembly according to claim 3 wherein said torsion bar has resilient mounting means supporting said torsion bar adjacent to said crank arm so that said torsion bar can flex as a spring in addition to providing torque resistance.

5. A bumper assembly according to claim 1 wherein said torsion bar has one end fixed to the frame and an intermediate portion supported eccentrically in a slightly flexible bearing structure to permit flexing as well as torquing of the bar.

6. A bumper assembly according to claim 1 and including a substantially horizontal elastomeric apron discrete from said member and bridging the space between said member and an adjacent member of the frame, and secured to at least one of said members.

7. A bumper assembly according to claim 3 wherein said resilient mounting means comprises a deformable collar block of resilient material peripherally secured to said frame and through which extends an intermediate portion of said push bar, between said impact member and said torsion bar, and an effectively conical member fixed to said push bar and arranged to progressively deform said collar block when said push bar and impact-receiving member are under impact conditions.

8. A bumper assembly according to claim 1 wherein said supporting means is duplicated adjacent each end of said impact-receiving member, with a corresponding duplication of the pushbar and torsion bar, so that the impact-receiving member can pivot about the supporting means at one end of the member with coincident and opposite movement of the corresponding pushbars and torsion bars, at the other end of the member whereby two way or doubled shock absorbing action is accomplished when the impact member at said one end thereof is in collision with a roadside obstacle or the vehicle is sideswiped.

* * * * *